Nov. 28, 1967  R. J. KERSTING  3,354,638
CONTROL VALVE

Filed Sept. 28, 1965  2 Sheets-Sheet 1

INVENTOR
RAYMOND J. KERSTING
BY
*Joseph E. Papin*

INVENTOR
RAYMOND J. KERSTING

United States Patent Office 3,354,638
Patented Nov. 28, 1967

3,354,638
CONTROL VALVE
Raymond J. Kersting, Dellwood, Mo., assignor, by mesne assignments, to Wagner Electric Corporation, a corporation of Delaware
Filed Sept. 28, 1965, Ser. No. 490,984
12 Claims. (Cl. 60—54.5)

ABSTRACT OF THE DISCLOSURE

A ratio changing control valve having differential valve means and piston means for effecting a ratio change between fluid pressure supplied to said control valve and fluid pressure applied therefrom after the magnitudes of the supplied and applied fluid pressures attain a predetermined value, and resilient means compressed by said piston means to store the energy thereof for assisting in the ratio change.

---

Figure 1:
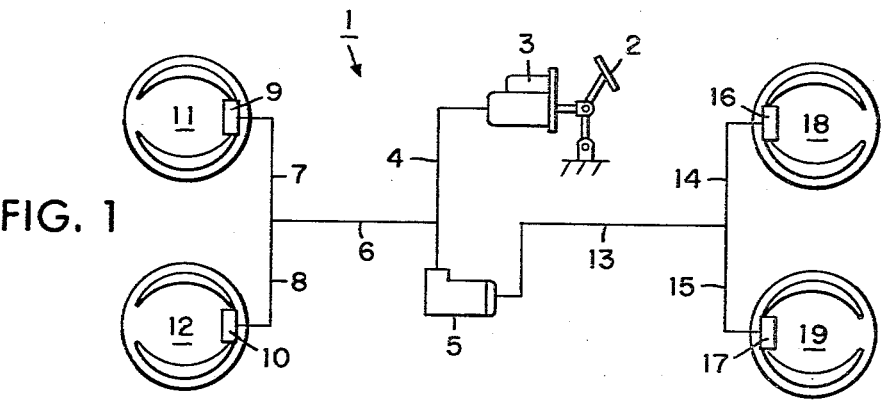

This invention relates to fluid pressure systems and more particularly to a control valve for use in such a fluid pressure system.

In the past, to compensate for the inertia weight shift toward the front of the vehicle during a braking application, the vehicle fluid pressure system was provided with a control valve which established a fluid pressure differential between the front and rear brakes for a greater energization of the front brakes than the rear brakes. However, these prior art control valves had the undesirable feature after initial energization of the front and rear brakes of maintaining the fluid pressure at the rear brakes substantially constant for a period of time, while the fluid pressure at the front brakes continued to increase so that the front brakes were additionally energized while the period of time elapsed before the rear brakes were additionally energized in proportion to the front brakes. Also, by establishing the aforementioned time period delay before the additional energization of the rear brakes, these prior art control valves did not effect a smooth transition into the fluid pressure differential between the front and rear brakes.

It is, therefore, a general object of the present invention to provide a novel control valve which overcomes the aforementioned undesirable feature.

Another object of the present invention is to provide a novel control valve in a vehicle fluid pressure system to effect a smooth transition into a fluid pressure differential between the front and rear brakes.

Another object of the present invention is to provide a novel control valve for effecting a fluid pressure differential between the front and rear brakes so that the front brakes are capable of applying a greater braking force than the rear brakes to compensate for the inertia weight shift toward the front of the vehicle during a braking application.

Another object of the present invention is to provide a novel control valve having energy storing means therein which is loaded during initial simultaneous energization of the front and rear brakes and which, upon the establishment of a predetermined fluid pressure, thereafter unloads to assist in providing a proportional fluid pressure differential between said front and rear brakes.

Still another object is to provide a control valve in a vehicle fluid pressure system containing a ratio changing piston having opposed differential ends in constant pressure fluid communication with the inlet and outlet ports of said control valve, said piston being movable in a first direction to a pressure fluid displacing position, and after initial energization of the front and rear brakes, said piston is movable in a pressure fluid displacing direction to establish a proportional fluid pressure differential between said front and rear brakes.

Still another object of the present invention is to provide a control valve of simplified construction for economy of manufacture.

These and other objects and advantages will become apparent hereinafter.

Briefly, the present invention comprises a control valve having a housing with a pair of ports therein, and a pair of resiliently urged means concertedly and relatively movable in said housing between said ports, said resiliently urged means being initially concertedly movable to a pressure fluid displacing position, and said resiliently urged means being relatively movable to interrupt pressure fluid communication between said ports, and thereafter said resiliently urged means are responsive to fluid pressure at one of said ports to concertedly move in a direction displacing pressure fluid at the other of said ports establishing a fluid pressure differential between said ports.

Figure 2:
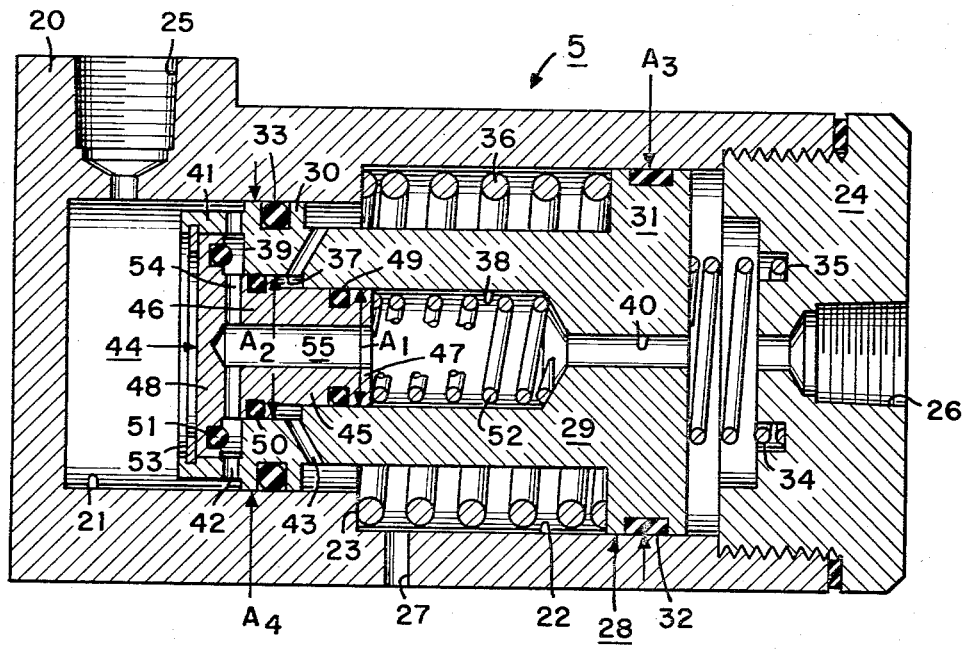
Figure 3:
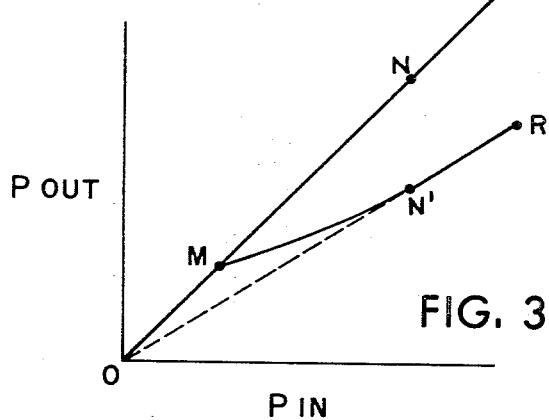
Figure 4:
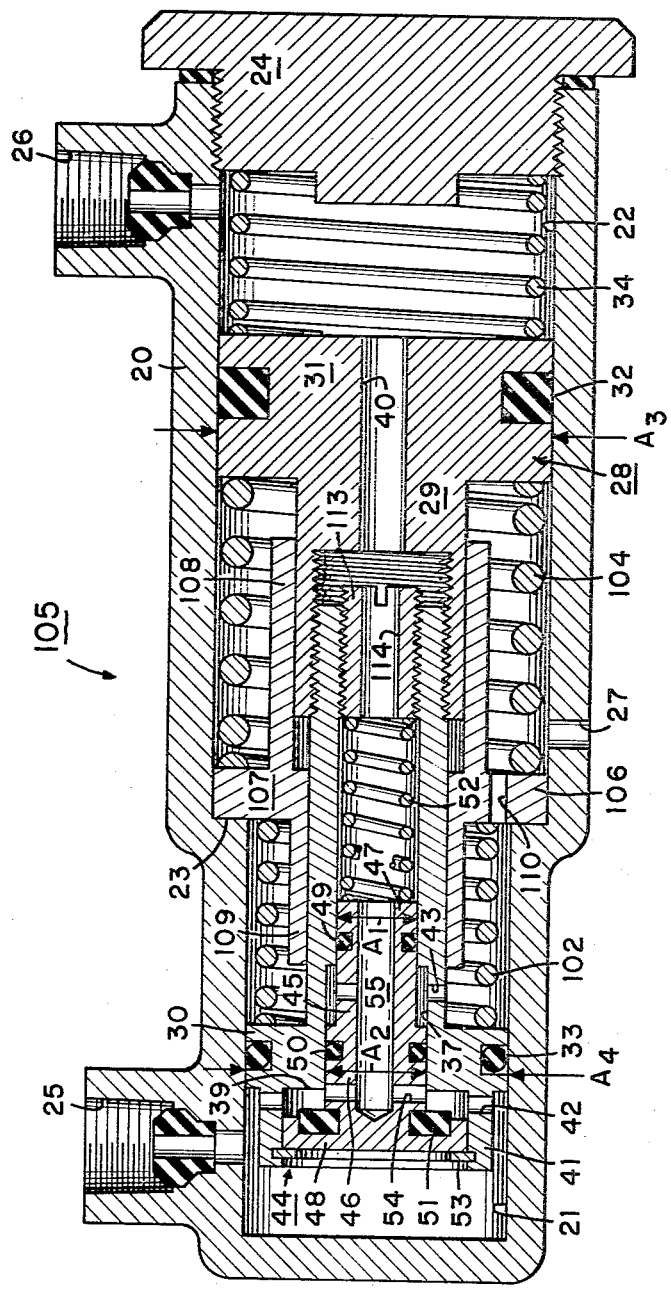

In the drawings which illustrate embodiments of the present invention,

FIG. 1 is a diagrammatic view of a fluid pressure system having a control valve therein embodying the present invention, FIG. 2 is a sectional view showing the control valve of FIG. 1 in cross-section, FIG. 3 is a graphical representation of the brake pressure as effected by the embodiment of the control valve as shown in FIG. 2, and FIG. 4 is a sectional view showing another embodiment of the present invention.

Referring to the drawings in detail and in particular to FIG. 1, a fluid pressure system 1 is provided with a brake pedal 2 operably connected with a fluid pressure generating means or a master cylinder 3, and a delivery conduit 4 connects the master cylinder 3 with the inlet port of a ratio changing or control valve 5. A conduit 6 has one end intersecting the conduit 4 while the other end thereof branches at 7, 8 for connection with servo motors or wheel cylinders 9, 10 of the front wheel brake assemblies 11, 12. Another conduit 13 has one end connected with the outlet port of the control valve 5 and the other end thereof branches at 14, 15 for connection with servo motors or wheel cylinders 16, 17 of the rear wheel brake assemblies 18, 19.

Referring now to FIG. 2, the control valve 5 is provided with a housing 20 having a bore and counterbore 21, 22 therein, and a radial shoulder 23 is defined at the juncture of said bore and counterbore. The leftward end of the bore 21 is closed by the housing 20, and the rightward end of the counterbore 22 is closed by a plug member 24 threadedly received therein. An inlet port 25 which receives the conduit 4, as previously mentioned, is provided in the housing 20 connecting with the bore 21 adjacent the leftward end thereof, and an outlet port 26 which receives the conduit 13, as previously mentioned, is provided in the plug 24 connecting with the rightward end of the counterbore 22. A venting passage 27 is provided in the housing 20 connecting with the counterbore 22 adjacent the radial shoulder 23.

A ratio changing or control piston, indicated generally at 28, is provided with a stepped body 29 having opposed ends 30, 31 which are slidably received in the bore and counterbore 21, 22, respectively. A peripheral seal 32 is provided in the piston body 29 adjacent the rightward or larger piston end 31 in sealing engagement with the housing counterbore 22, and another peripheral seal 33 is provided in the leftward or smaller piston end 30 in sealing engagement with the housing bore 21. A return spring 34 is positioned with one end in a groove 35 in the plug member 24 and said spring is biased between the housing plug member 24 and the larger piston end 31 normally urging the piston 28 leftwardly. An energy storing spring 36 is provided in concentric relation with the piston body 29 and biased between the larger piston end 31 and the housing shoulder 23 normally urging the piston 28 rightwardly in opposition to the return spring 34 to a position where the forces of the springs 34 and 36 are balanced and the large piston end 31 is spaced rightwardly of the housing shoulder 23. Stepped bores 37, 38 are axially provided in the piston body 29, and a valve seat 39 is provided on the leftward piston end 30 about the larger stepped bore 37. Another aperture 40 is provided through the rightward end 31 of the piston body 29 connecting with the smaller of the stepped bores 38. A hollow cylindrical extension 41 is provided on the leftward piston end 30 radially outwardly of the valve seat 39 and axially aligned with the larger stepped bore 37, and a plurality of radially extending passages 42 are provided through the cylindrical extension 41 adjacent the leftward piston end 30. Another venting passage 43 is provided in the piston body 29 intersecting the larger stepped bore 37 adjacent the juncture of the stepped bores 37, 38 and connecting with the housing counterbore 22 and the atmospheric venting passage 27.

A valve member 44 is provided with a stepped body 45 having opposed ends 46, 47 which are slidably received in the piston stepped bores 37, 38, respectively, and an enlarged head 48 integrally connected to the leftward valve end 46 is movably received in the cylindrical extension 41. A peripheral seal 49 is provided in the stepped body 45 adjacent the rightward or smaller end 47 in sealing engagement with the smaller piston stepped bore 38, and another peripheral seal 50 is provided in the stepped body 45 adjacent the leftward or larger end 46 in sealing engagement with the larger piston stepped bore 37. An annular seal 51 is carried in the valve head 48 adjacent the periphery thereof for sealing engagement with the piston valve seat 39. A return spring 52 is positioned between the rightward end of the smaller stepped bore 38 and the rightward end 47 of the valve member 44 normally urging said valve member leftwardly to abuttingly engage the valve head 48 with a snap ring and groove assembly 53 provided in the cylindrical extension 41 adjacent the leftward end thereof and normally urging the valve head seal 51 away from the cooperating piston valve seat 39. A plurality of cross-passages 54 are provided in the valve member 44 adjacent the head 48 and intersecting with an axially located passage 55 which extends through the rightward end 47 of the valve body 45. The rightward end 47 of the valve body 45 across the peripheral seal 49 provides an effective fluid pressure responsive area $A_1$ which is predeterminately smaller than the effective fluid pressure responsive area $A_2$ provided by the leftward end 46 of said valve body across the peripheral seal 50. Also, the rightward end 31 of the piston body 29 across the annular seal 32 provides an effective fluid pressure responsive area $A_3$ which is predeterminately larger than the effective fluid pressure responsive area $A_4$ provided by the leftward end 30 of said piston body across the seal 33.

In the operation with the component parts of the control valve 5 in their normal positions as shown in FIG. 2 and as described hereinabove, a manually applied force to the brake pedal 2 displaces pressure fluid from the master cylinder 3 through the conduits 4, 6, 7 and 8 into the wheel cylinders 9, 10 for initial energization of the front brake assemblies 11, 12. The displaced pressure fluid also flows from the conduit 4 through the inlet port 25 of the control valve 5 into the housing bore 21 and therefrom through the radially extending passages 42 in the cylindrical extension 41, the chamber formed between valve head 48 and piston valve seat 39, the cross-passages 54 and the axial passage 55 of the valve member 44, the small stepped bore 38 and aperture 40 in the piston body 29 into the housing counterbore 22. The displaced pressure fluid flows from the counterbore 22 through the outlet port 26 and conduits 13, 14 and 15, into the wheel cylinders 16, 17 for initial energization of the rear brake assemblies 18, 19 substantially simultaneous with the initial energization of the front brake assemblies 11, 12.

During the initial energization of the front and rear brake assemblies 11, 12 and 18, 19, the fluid pressure of the displaced pressure fluid at the inlet and outlet ports 25, 26 of the control valve 5 is substantially equal. The displaced fluid pressure at the outlet port 26 acts on the larger effective area $A_3$ of the piston 28 to establish an output force Fo, and the fluid pressure at the inlet port 25 acts on the smaller effective area $A_4$ of said piston to establish an input force Fi in opposition to the force Fo across the piston 28. Since the output force Fo is predeterminately larger than the input force Fi, the piston 28 is urged leftwardly against the force Fs of the energy storing spring 36 toward a pressure fluid displacement position, compressing or loading the energy storing spring 36 and increasing the force Fs. This leftward movement of the piston 28 disengages the piston end 31 from the return spring 34, but said return spring is held in its operative position by the groove 35. Also, the displaced fluid pressure at the outlet port 26 acts on the smaller effective area $A_1$ of the valve member 44 to establish a force $F_1$, and the fluid pressure at the inlet port 25 acts on the larger effective area $A_2$ of said valve member to establish another force $F_2$ opposing the force $F_1$ across the valve member 44. When the displaced pressure fluid attains a predetermined value M (FIG. 3), the magnitude of the force $F_2$ overcomes the magnitude of the force $F_1$ plus the compressive force Fcr of the return spring 52, across the valve member 44, thereby serving to move the valve member 44 rightwardly relative to the piston 28 to a position sealably engaging the valve head seal 51 with the valve seat 39 interrupting pressure fluid communication through the piston 28 between the inlet and outlet ports 25, 26 of the control valve 5.

When the valve element 51 is engaged with the valve seat 39 to interrupt pressure fluid flow through the piston 28, the input force Fi plus the force Fs of the spring 36 is balanced by the opposing output force Fo and when the input fluid pressure Pi is increased above the predetermined value M, the magnitude of the input force Fi assisted by the force Fs exceeds the magnitude of the output force Fo, and the piston 28 and valve member 44 are concertedly moved rightwardly in the housing bore and counterbore 21, 22 in a pressure fluid displacing direction to increase the output fluid pressure Po delivered to the rear brake assemblies 18, 19 in a ratio to the input fluid pressure Pi, as shown by the formula:

$$Po = \frac{PiA_4 + Fs}{A_3}$$

It should be noted that as the input fluid pressure Pi is increased above the predetermined value M, and the piston 28 and valve member 44 are urged rightwardly, the spring 36 releases the stored energy and the effect of the force Fs due to the decompressing or unloading of the spring 36 is so diminished as to be negligible above a second predetermined input fluid pressure N (FIG. 3), and the output fluid pressure Po is thereafter increased in a ratio to the input fluid pressure P*i*, as shown by the formula:

$$Po = \frac{PiA_4}{A_3}$$

As illustrated by the graphical representation of the braking pressure in FIG. 3, until the displaced pressure fluid attains the predetermined value M, the output fluid pressure P*o* from the ratio changer 5 to the rear wheel brake assemblies 18, 19 is in direct proportion, i.e., a 1:1 ratio, to the input fluid pressure P*i* as shown by the line OM. This predetermined fluid pressure M is equivalent to the fluid pressure required to overcome the inherent resistances of the fluid pressure system 1 and to initially energize the front and rear brake assemblies 11, 12 and 18, 19. When the predetermined fluid pressure M is attained, the piston 28 has moved to a pressure fluid displacing position and the spring 36 is in its stored energy or loaded position. Also, when the predetermined fluid pressure M is attained, the valve head seal 51 is moved into sealing engagement with the valve seat 39 interrupting pressure fluid communication between the inlet and outlet ports 25, 26 of the control valve 5 and a ratio change between the input and output fluid pressures P*i*, P*o* is effected as described hereinabove. As the input fluid pressure P*i* is increased above the predetermined value M, as illustrated by the line MN, the input force F*i* is increased which is additive to the release of energy or unloading of the spring 36 to move the piston 28 in its pressure fluid displacing direction, thereby increasing the output fluid pressure P*o*, as illustrated by the line MN', in the ratio of the first formula described hereinabove. The release of the stored energy by the spring 36 has the effect of providing a smooth transition during the ratio change between the input and output fluid pressures P*i*, P*o* and of assisting in the substantially simultaneous increase in the output fluid pressure P*o* in proportion to increases in the input fluid pressure P*i*. After the input fluid pressure attains the value N, the spring 36 has released most or all of its stored energy and its effect is negligible in assisting in further pressure fluid displacement by the piston 28, so that as the input fluid pressure P*i* is increased above the value N, as illustrated by the line NX, a corresponding increase in the output fluid pressure P*o* results, as shown by the line N'R, and the input and output fluid pressures P*i*, P*o* are effected in the ratio of the second formula described hereinabove. In this manner, the control valve 5 effects a ratio change between the input and output fluid pressures P*i*, P*o* so that the fluid pressure at the front brake assemblies 11, 12 is predeterminately greater than the fluid pressure at the rear brake assemblies 18, 19. Therefore, the front brake assemblies 11, 12 are capable of applying a greater braking force than the rear brake assemblies 18, 19 to compensate for the inertia weight shift toward the front of the vehicle during a braking application.

When the desired braking application is obtained, the manually applied force is removed from the brake pedal 2 permitting the return flow of pressure fluid to the master cylinder 3. The front brake assemblies 11, 12 are de-energized by the return flow of pressure fluid from the wheel cylinders 9, 10 through conduits 7, 8, 6 and 4 to the master cylinder 3. This return flow of pressure fluid also has the effect of eliminating the input fluid pressure P*i* at the inlet port 25 of the control valve 5 so that the forces F$_2$ and F*i* are eliminated. With the force F*i* eliminated, the force F*o* and the force of the return spring 34 urge the piston 28 leftwardly in opposition to the force F*s* of the spring 36. Also, with the force F$_2$ eliminated, the force F$_1$ and the compressive force F*cr* of the return spring 52 urge the valve member 44 leftwardly toward its original position in abutting engagement with the snap ring 53 and disengages the seal 51 from the valve seat 39 to again establish pressure fluid communication between the inlet and outlet ports 25, 26. With the seal 51 disengaged from the valve seat 39, the output fluid pressure P*o* is eliminated and the piston 28 is returned to its original position balanced between the opposing forces of the springs 34 and 36 and having the large piston end 31 spaced rightwardly of the housing shoulder 23. The rear brake assemblies 18, 19 are thereafter de-energized by the displaced pressure fluid flowing from the wheel cylinders 16, 17 through the conduits 14, 15 and 13 into the outlet port 26 of the control valve 5 and therefrom through the housing counterbore 22, the aperture 40 and the smaller stepped bore 38 of the piston body 29, the axial passage 55 and the cross-passages 54 of the valve member 44, the chamber formed between the valve head 48 and the piston valve seat 39, the radially extending passages 42 in the cylindrical extension 41 and the housing bore 21 to the inlet port 25. The return flow of displaced pressure fluid flows from the inlet port 25 through conduit 4 into the master cylinder 3, substantially simultaneous with the return flow from the front brake assemblies 11, 12, as previously described, to effect de-energization of the front and rear brake assemblies 11, 12 and 18, 19 at the same time.

Referring now to FIG. 4, a control valve 105 shown therein is provided with substantially the same component parts and functions in the system 1 in substantially the same manner as the previously described control valve 5 with the following exceptions.

The outlet port 26 is provided in the housing 20 intersecting the counterbore 22 adjacent the rightward end thereof. The opposed piston ends 30, 31 have axial portions 30*a*, 31*a*, respectively, and said axial portions are threadedly connected to form the piston body 29. Also, the opposed piston ends 30, 31 confine or cage therebetween a pair of preloaded energy storing springs 102, 104 and an abutment member 106, said abutment member being provided between said springs.

The abutment member 106 is provided with a disc or washer portion 107 in concentric relation with the piston body 29, and said washer portion is movable in the housing counterbore 22 and extends radially outwardly from said piston body to be engageable with the housing shoulder 23. The washer portion 107 has axial extensions 108, 109, respectively, connected to the rightward and leftward faces of said washer portion and are concentric with the piston body 29. A venting passage 110 is provided axially through the washer portion 107 connecting the housing bore 21 and the venting passages 43 with the housing counterbore 22 and the atmospheric venting passage 27 to obviate damping.

The energy storing spring 102 is provided in concentric relation with the piston body 29 and the leftward axial extension 109 and is biased between the leftward piston end 30 and the leftward face of the washer portion 107. The energy storing spring 104 is provided in concentric relation with the piston body 29 and the rightward axial extension 108 and is biased between the rightward piston end 31 and the rightward face of the washer portion 107. Since the abutment member 106 is free to move between the opposed piston ends 30, 31, the opposed forces F*s*$_1$ and F*s*$_2$ of the preloaded energy storing springs 102, 104, respectively, urge said abutment member to a position between said oposed piston ends where the opposed spring forces F*s*$_1$ and F*s*$_2$ are equal.

With the abutment member 106 balanced between the opposing spring forces F*s*$_1$ and F*s*$_2$, the force of the return spring 34 urges the piston 28 leftwardly and the leftward face of the washer portion 107 abuttingly engages the housing shoulder 23. With the washer portion 107 in abutting engagement with the housing shoulder 23, the spring 104 has the effect of being biased between the housing shoulder 23 and the rightward piston end 31, and the force F*s*$_2$ of the spring 104 urges the piston 28 rightwardly. However, the force F*s*$_2$ urging the piston 28 rightwardly is counteracted or opposed by the force Fs₁ of the spring 102 urging the piston leftwardly, and the springs 102, 104 have an effect on the movement of piston 28 only when a differential is established between the spring forces Fs₁ and Fs₂. Due to the force of the return spring 34, the piston 28 is urged leftwardly to its original position with the larger piston end 31 spaced rightwardly from the housing shoulder 23, and this leftward movement of the piston 28 compresses the preloaded energy storing spring 104 increasing the force Fs₂ while the preloaded energy storing spring 102 expands decreasing the force Fs₁, and a differential force (Fs₂−Fs₁) initially urges the piston 28 rightwardly to balance the force of the return spring 34 urging the piston 28 leftwardly. Therefore, the forces of the springs 102, 104 and 34 acting on the piston 28 balance one another and said springs are ineffective in assisting in the movement of the piston 28 from its original position.

The return spring 52 is adjustably pre-compressed between the rightward end 47 of the valve member 44 and an adjustable retaining member 113 is threadedly received in the rightward end of the axial portion 30a, said retaining member having an axial passage 114 therethrough connecting the piston bore 38 in pressure fluid communication with the aperture 40.

It should be noted that by having the energy storing springs 102, 104 assembled with an initial preload, as hereinbefore described, any movement of the piston 28 from its original position will result in a compressing of one spring and an expanding of the other spring substantially simultaneously. Therefore, a force differential between the spring forces Fs₁ and Fs₂ for assisting in the movement of the piston 28 is established with half the spring deflection required by a single spring to obtain a force equivalent to the force differential, so that the piston travel is reduced and a smaller volume of pressure fluid displacement is required for effective operation of the control valve 105.

In the operation of the control valve 105 with the component parts in their original positions, as shown in FIG. 4, the displaced fluid pressure at the inlet port 25 acts on the smaller effective area A₄ of the piston 28 to establish a force Fi across said piston in opposition to a predeterminately larger force Fo established by the fluid pressure at the outlet port 26 acting on the larger effective area A₃ of said piston. Since the force Fo is predeterminately larger than the force Fi, the piston 28 is urged leftwardly and, due to the washer portion 107 being in engagement with the housing shoulder 23, the leftward movement of the piston 28 results in the energy storing spring 102 expanding or releasing some of its preloaded energy, thereby decreasing the force Fs₁ and correspondingly the energy storing spring 104 is further compressed or loaded, thereby increasing the force Fs₂ so that an increasing spring load or force differential is established between the forces Fs₁ and Fs₂ which has the effect of opposing this leftward movement of the piston 28.

When the valve element 51 is engaged with the valve seat 39 to interrupt pressure fluid flow through the piston 28 in response to a predetermined fluid pressure M, as hereinabove described, the output force Fo is balanced by the opposing input force Fi plus the spring load or force differential between the forces Fs₂ and Fs₁ of the energy storing springs 104, 102. Thereafter, if the input fluid pressure Pi is increased above the predetermined value M, the magnitude of the input force Fi additive to the force differential between the spring forces Fs₁ and Fs₂ exceeds the magnitude of the output force Fo, and piston 28 and valve member 44 are concertly moved rightwardly to increase the output fluid pressure Po in a ratio to the input fluid pressure Pi as shown by the formula:

$$Po = \frac{PiA_4 + (Fs_2 - Fs_1)}{A_3}$$

As the piston 28 and valve member 44 are urged rightwardly, the spring 104 releases its stored energy or unloads, and correspondingly, the spring 102 is compressed or loaded and the spring load or differential pressed between the opposing spring forces Fs₂ and Fs₁ is diminished. When the spring forces Fs₁ and Fs₂ are again balanced or substantially equal, the rightward movement of piston 28 disengages the washer portion 107 of the abutment member 106 from the housing shoulder 23, serving to give the springs 102, 104 the effect of being biased between the opposed ends 30, 31 of the piston body 29. With the spring load or force differential between the springs forces Fs₁ and Fs₂ eliminated, and the springs 102, 104 having the effect of being biased between the opposed piston ends 30, 31, the energy storing springs 102, 104 have no effect upon further rightward movement of the piston 28 and the output fluid pressure Po is thereafter increased in a ratio to the input fluid pressure Pi, as shown by the formula:

$$Po = \frac{PiA_4}{A_3}$$

From the foregoing, it is now apparent that a novel control valve meeting the objects set out hereinbefore is provided and that changes or modifications as to the precise configurations, shapes and details of the construction set forth in the disclosure by way of illustration may be made by those skilled in the art without departing from the spirit of the invention, as defined by the claims which follow.

The embodiments of the invention in which an exclusive property or privilege is claimed are defined as follows:

1. A control valve comprising a housing having a pair of ports therein, a pair of resiliently urged means concertedly and relatively movable in said housing to control pressure fluid communication between said ports, and opposed differential areas on each of said resiliently urged means for respective subjection to fluid pressure at said ports, said pair of resiliently urged means being initially concertedly movable in response to fluid pressure at said ports less than a predetermined value acting on said opposed differential areas of one of said resiliently urged means toward a position in said housing storing the inherent energy of said one resiliently urged means, the other of said resiliently urged means being movable relative to said one resiliently urged means toward a position interrupting pressure fluid communication between said ports when the fluid pressure at said ports acting on said opposed differential areas of said other resiliently urged means attains the predetermined value, and said pair of resiliently urged means being thereafter concertedly movable in response to increased fluid pressure at one of said ports above the predetermined value acting on one of the opposed differential areas of said pair of resiliently urged means respectively and assisted by the release of the stored energy of said one resiliently urged means toward another position in said housing to effect an increase in the fluid pressure at the other of said ports above the predetermined value acting on the other of the opposed differential areas of said pair of resiliently urged means respectively in a predetermined ratio to the increased fluid pressure at said one port above the predetermined value.

2. A control valve comprising a housing having a pair of ports therein, means movable in said housing between said ports, opposed differential areas on said first named means for respective subjection to fluid pressure at said ports, resilient means opposing movement of said first named means toward one of said ports, resiliently urged valve means movable in said first named means and controlling pressure fluid communication between said ports, other opposed differential areas on said valve means for respective subjection to fluid pressure at said ports, said first named means being initially movable toward said one port to load said resilient means in response to fluid pressure at said ports less than a predetermined value respectively acting on said first named means opposed differential areas, said valve means being movable toward a position interrupting pressure fluid communication between said ports when the fluid pressure at said ports respectively acting on the other opposed differential areas attains the predetermined value, and said first named means and valve means being thereafter concertedly movable toward the other of said ports in response to increased fluid pressure at said one port in excess of the predetermined value acting on one area of the first named and other opposed differential areas, respectively, and assisted by said resilient means unloading to increase the fluid pressure at said other port in a predetermined ratio to the fluid pressure at said one port in excess of the predetermined value.

3. A control valve comprising a housing having a pair of ports therein, piston means movable in said housing between said ports and having opposed ends defining opposed differential areas respectively responsive to fluid pressure at said ports, resilient means opposing movement of said piston means toward one of said ports, a bore in said piston means between the opposed ends thereof and connected between said ports, said piston means being initially movable toward said one port in response to fluid pressure at said ports less than a predetermined value acting on said opposed differential areas to load said resilient means, valve means in said bore normally urged toward a position establishing pressure fluid communication between said ports and having other opposed ends defining other opposed differential areas respectively responsive to fluid pressure at said ports, said valve means being movable toward a position in said bore interrupting pressure fluid communication between said ports when the fluid pressure at said ports respectively acting on said other opposed differential areas attains the predetermined value, and said piston means and valve means being thereafter concertedly movable toward the other of said ports in response to increased fluid pressure at said one port in excess of the predetermined value acting on one of their opposed differential areas, respectively, and assisted by the unloading of said resilient means to increase the fluid pressure in excess of the predetermined value at said other port in a predetermined ratio to the increased fluid pressure excess of the predetermined value at said one port.

4. A control valve comprising a housing having a pair of spaced ports therein, piston means having opposed ends movable in said housing between said ports, said opposed ends defining opposed differential areas respectively responsive to fluid pressure at said ports, resilient means engaged between said housing and said piston means to oppose movement thereof toward one of said ports, a bore in said piston means connected between the opposed ends thereof, a valve seat on said piston means in circumscribing relation with said bore, valve means for engagement with said valve seat and slidable in said bore, said valve means also having other opposed differential areas respectively responsive to fluid pressure at said ports, other resilient means normally urging said valve means toward a position disengaged from said valve seat, and passage means in said valve means connecting said ports in pressure fluid communication when said valve means is disengaged from said valve seat, said piston means being movable against said first named resilient means toward said one port in response to fluid pressure at said ports less than a predetermined value respectively acting on said piston means opposed differential areas to load said resilient means, said valve means being movable when the magnitude of the fluid pressure at said ports respectively acting on said valve means differential areas attains the predetermined value into engagement with said valve seat closing said passage means and interrupting pressure fluid communication through said bore between said ports through said passage means, and said piston means and said valve means being thereafter concertedly movable toward the other of said ports in response to increased fluid pressure in excess of the predetermined value at said one port respectively acting on one of said opposed differential areas of said piston means and said valve means plus the force of said resilient means unloading to increase the fluid pressure in excess of a predetermined value at said other port acting on the other of said differential areas of said piston means and said valve means in an inverse ratio to the increased fluid pressure in excess of the predetermined value at said one port.

5. A control valve comprising a housing having a bore and counterbore therein, inlet and outlet ports in said housing and respectively connected with said bore and counterbore, a stepped piston having opposed ends slidable in said bore and counterbore between said inlet and outlet ports and defining opposed differential areas respectively responsive to fluid pressure at said inlet and outlet ports, resilient means urging said piston in one direction toward said counterbore, a stepped bore in said piston connected between said inlet and outlet ends thereof, a valve seat on said piston inlet end about said stepped bore, valve means contained in said piston including a stepped body portion slidable in said piston stepped bore and having opposed inlet and outlet ends defining other proposed effective areas respectively responsive to fluid pressure at said inlet and outlet ports, a head portion connected to said valve means body portion inlet end for sealing engagement with said valve seat, a valve spring engaged with said valve means normally urging said head portion toward a position in abutting engagement with said piston and spaced from said valve seat, and passage means in said valve means normally connecting said inlet and outlet ports in pressure fluid communication when said valve means head portion is disengaged from said valve seat, said piston being movable in a direction opposite the one direction against said resilient means in response to fluid pressure at said inlet and outlet ports respectively acting on said piston opposed differential areas to a position and loading said resilient means, said valve means also being movable in response to fluid pressure of a predetermined value at said inlet and outlet ports respectively acting on said other opposed differential areas to engage said head portion with said valve seat closing said passage means and interrupting pressure fluid communication through said piston stepped bores between said inlet and outlet ports, and said piston and valve means being thereafter concertedly movable in said one direction in response to increased fluid pressure at said inlet port above the predetermined value acting on one of the opposed differential areas of said piston and said valve means respectively and assisted by said resilient means unloading increase the pressure fluid at said outlet port acting on the other of said opposed differential areas of said piston and said valve means respective in a predetermined ratio to the increased fluid pressure at said inlet port in excess of the predetermined value.

6. A control valve comprising a housing having a bore and counterbore therein, inlet and outlet ports in said housing and respectively connected with said bore and counterbore, a stepped piston having opposed ends slidable in said bore and counterfore between said inlet and outlet ports, said opposed ends being respectively responsive to fluid pressure at said inlet and outlet ports, said piston inlet end having an effective fluid pressure responsive area predeterminately smaller than the effective fluid pressure responsive area of said opposed piston outlet end, first resilient means urging said piston in one direction, a stepped bore in said piston between said inlet and outlet ends thereof, a valve seat on said piston inlet end in circumscribing relation with said stepped bore, extension means on said piston inlet end radially outwardly of said valve seat, valve means including a stepped body portion slidable in said piston stepped bore and having opposed inlet and outlet ends respectively responsive to fluid pressure at said inlet and outlet ports, said body portion inlet end having an effective fluid pressure responsive area predeterminately larger than the effective fluid pressure responsive area of said body portion outlet end, a head portion connected to said body portion inlet end and movable in said extension means for sealing engagement with said valve seat, passage means in said valve means normally connecting said inlet and outlet ports in pressure fluid communication, and second resilient means engaged with said body portion and normally urging said head portion to a position disengaged from said valve seat to provide pressure fluid communication between said ports through said passage means, said piston being movable in a direction opposing said first resilient means in response to initially applied fluid pressure at said inlet and outlet ports respectively acting on said piston inlet and outlet end areas to a fluid pressure displacing position and loading said first resilient means, said valve means being movable relative to said piston in response to a predetermined fluid pressure at said inlet and outlet ports respectively acting on said body portion inlet and outlet end areas to engage said head portion with said valve seat and thereby close said passage means interrupting pressure fluid communication between said inlet and outlet ports, and said piston and said valve means being thereafter concertedly movable in said one direction in response to increased fluid pressure at said inlet port above the predetermined value acting on the respective inlet end areas of said piston and said valve means assisted by said first resilient means unloading to increase the fluid pressure at said outlet port acting on the respective outlet end areas of said piston and said valve means in a predetermined ratio to the fluid pressure at said inlet port in excess of the predetermined value.

7. A control valve comprising a housing having a bore and counterbore therein, inlet and outlet ports in said housing and respectively connected with said bore and counterbore, a stepped piston having opposed ends slidable in said bore and counterbore between said inlet and outlet ports, said opposed ends being respectively responsive to fluid pressure at said inlet and outlet ports, said piston inlet end having an effective fluid pressure responsive area predeterminately smaller than the effective fluid pressure responsive area of said opposed piston outlet end, first resilient means biased between said piston and said housing normally urging said piston toward said outlet port, a stepped bore in said piston between said inlet and outlet ends thereof, a valve seat on said piston inlet end in circumscribing relation with said stepped bore, cylindrical extension means connected to said piston inlet end and radially outward of said valve seat, abutment means in said extension means spaced from said piston inlet end, valve means including a stepped body portion slidable in said piston stepped bore and having opposed inlet and outlet ends respectively responsive to fluid pressure at said inlet and outlet ports, said body portion inlet end having an effective fluid pressure responsive area predeterminately larger than the effective fluid pressure responsive area of said body portion outlet end, a head portion connected to said body portion inlet end and movable in said extension means, a seal on said head portion for sealing engagement with said valve seat, passage means in said valve means normally connecting said inlet and outlet ports in pressure fluid communication including a radial passage in said body portion adjacent said head portion and connected to an axial passage extending therefrom through said body portion outlet end, second resilient means engaged with said body portion and normally urging said head portion to a position engaging said abutment means and disengaging said seal from said valve seat to provide pressure fluid communication between said ports through said passage means, said piston and said valve means being concertedly movable toward said inlet port in response to initially applied fluid pressure at said inlet and outlet ports respectively acting on said piston inlet and outlet end areas to a fluid pressure displacing position and loading said first resilient means, said valve means being movable relative to said piston in response to a predetermined fluid pressure at said inlet and outlet ports respectively acting on said body portion inlet and outlet end areas to engage said seal with said valve seat and thereby close said passage means interrupting pressure fluid communication between said inlet and outlet ports, and said piston and said valve means being thereafter concertedly movable toward said outlet port in response to increased fluid pressure at said inlet port above the predetermined value acting on the respective inlet end areas of said piston and said valve means assisted by said first resilient means unloading to increase the fluid pressure at said outlet port acting on the respective outlet end areas of said piston and said valve means in a predetermined ratio to the fluid pressure at said inlet port in excess of the predetermined value.

8. A control valve comprising a housing having a pair of ports therein, piston means movable in said housing between said ports and having opposed ends respectively subjected to fluid pressure at said ports, other means on said piston means intermediate said opposed ends including a portion for engagement with said housing, a pair of opposed resilient means respectively caged between said opposed piston ends and said other means, and valve means movable in said piston means and controlling pressure fluid communication between said ports, said piston means being movable toward one of said ports in response to fluid pressure at said ports less than a predetermined value respectively acting on said opposed piston ends to urge said included means toward engagement with said housing and to compress one of said resilient means while the other of said resilient means expands to release a portion of its compressive force substantially equal to that stored by said one resiliently urged means upon the compression thereof, other opposed end portions on said valve means for respective subjection to the fluid pressure at said ports, said valve means being movable toward a position interrupting pressure fluid communication between said ports when the fluid pressure at said ports respectively acting on said valve means opposed ends attains the predetermined value, and said piston means and valve means being thereafter movable in the opposite direction in response to fluid pressure at one of said ports in excess of the predetermined value acting on one of the first named and other opposed ends to increase the fluid pressure at the other of said ports acting on the other of the first named and other opposed ends in a predetermined ratio with that at said one port.

9. A control valve comprising a housing having a pair of ports therein, piston means having opposed ends movable in said housing between said ports, said opposed ends defining opposed differential areas respectively responsive to fluid pressure at said ports, an abutment member movable on said piston means intermediate said opposed ends and abuttingly engageable with said housing, a pair of opposed preloaded springs respectively caged between said opposed ends and said abutment member and having their respective compressive forces substantially balanced, a bore in said piston means between said opposed ends thereof, said piston means being movable in a first direction in response to fluid pressure less than a predetermined value at said ports acting on said opposed differential areas to increase the compressive force of one of said springs thereby urging said abutment member toward engagement with said housing and decreasing the compressive force of the other of said springs by an amount substantially equal to that stored by said one spring, valve means for engagement with said piston means and controlling pressure fluid communication between said ports through said bore, said valve means being engaged with said piston means upon the movement thereof in the first direction when the fluid pressure at said ports attains the predetermined value, said piston means being initially movable in the opposite direction in response to fluid pressure at one of said ports in excess of the predetermined value acting on one of said opposed differential areas and assisted by the stored compressive force of said one spring to increase the fluid pressure at the other of said ports acting on the other of said opposed differential areas in a predetermined ratio with the fluid pressure at said one port, said other spring being compressed to restore its decreased compressive force upon the movement of said piston means in the opposite direction disengages said abutment member from said housing and said piston means being thereafter further movable in the other direction when said abutment member is disengaged from said housing only in response to further increases in the fluid pressure at said one port to effect further increases in the fluid pressure at said other port thereby establishing another ratio between the fluid pressures at said ports different than the first named predetermined ratio.

10. A control valve comprising a housing having a bore and counterbore therein and a radial shoulder at the juncture thereof, inlet and outlet ports in said housing and respectively connected with said bore and counterbore, a stepped piston having opposed ends slidable in said bore and counterbore between said inlet and outlet ports, a first area on one of said opposed ends responsive to fluid pressure at said inlet port, a second area on the other of said opposed ends opposed to and predeterminately greater than said first area and responsive to fluid pressure at said outlet port, an abutment member movable on said piston intermediate said opposed ends and having a portion engageable with said housing shoulder, a first preloaded spring caged between said one opposed end and said abutment member, a second preloaded spring caged between said other opposed end and said abutment member, said abutment member normally being balanced between the opposed compressive force of said first and second spring, passage means through said piston means connecting said inlet and outlet ports in pressure fluid communication, valve means movable in said passage means controlling pressure fluid communication between said inlet and outlet ports, and opposed differential areas on said valve means for respective subjection to the fluid pressure at said inlet and outlet ports, said piston being movable in one direction in response to fluid pressure at said inlet and outlet ports less than a predetermined value respectively acting on said first and second areas to increase the compressive force of said second spring between said other opposed end and said abutment member urging said abutment member portion toward engagement with said housing shoulder and decreasing the compressive force of said first spring between said one opposed end and said abutment member, said valve means being movable in response to fluid pressure at said inlet and outlet ports respectively acting on said opposed differential areas when the magnitude of the fluid pressure at said inlet and outlet ports attains the predetermined value to close said passage means interrupting pressure fluid communication between said inlet outlet ports, and said piston being thereafter movable in a direction opposite said one direction in response to fluid pressure at said inlet port in excess of the predetermined value acting on said first area and assisted by the stored compressive force of the second spring to increase the fluid pressure at said outlet port acting on said second area in a predetermined ratio to the fluid pressure at said inlet port, said first spring being compressed to restore the decreased portion of its compressive force and oppose movement of said piston in the opposite direction until the compressive forces of said first and second springs are again substantially balanced, and said piston being thereafter further movable in the opposite direction to disengage said abutment member portion from said housing shoulder only in response to further increases in the fluid pressure at said inlet port acting on said first area to effect further increases in the fluid pressure at said outlet port acting on said second area in another predetermined ratio different than the first named predetermined ratio.

11. A control valve comprising a housing, a pair of members movable in said housing for controlling the application through said housing of fluid pressure supplied thereto, opposed portions on one of said members for respective subjection to the supplied and applied fluid pressures, said one member being movable in one direction toward one position in said housing in response to the supplied and applied fluid pressures less than a predetermined value respectively acting on said opposed portions, the other of said members being engaged with said one member upon movement thereof toward its one position to isolate the supplied and applied fluid pressures when the magnitudes thereof attain the predetermined value, means on said one member between said opposed portions for movement therewith in a direction opposite to the one direction and including other means for engagement with said housing to limit movement of said first named means with said one member in the one direction, and a pair of opposed resilient means respectively contained between said opposed portions and said first named means, one of said resilient means being compressed to oppose the movement of said one member in the one direction and urge said other means toward engagement with said housing while the other of said resilient means expands to release a portion of its compressive force substantially equal to that stored by said one resilient means upon the compression thereof, said one and other members being initially movable in the opposite direction in response to increases in the isolated supplied fluid pressure in excess of the predetermined value acting on one of said opposed portions assisted by the stored compressive force of said one resilient means to effect an increase in the isolated applied fluid pressure acting on the other of said opposed portions in a predetermined ratio with the increased isolated supplied fluid pressure, and said other resilient means being compressed to restore the released portion of its compressive force and oppose the movement of said one and other members in the opposite direction until such movement disengages said other means from said housing, and said one and other member being thereafter further movable in the other direction when said other means is disengaged from said housing only in response to further increases in the isolated supplied fluid pressure acting on said one opposed portion to effect further increases in the isolated applied fluid pressure acting on said other opposed portion in another predetermined ratio with the isolated supplied fluid pressure different than the first named predetermined ratio.

12. In a control valve having a housing, means having opposed portions and movable in said housing between opposed positions, other means on said first named means between said opposed portions for movement therewith toward one of the opposed positions and including means for engagement with said housing to limit movement of said other means with said first named means toward the other of the opposed positions, and a pair of opposed resilient means respectively contained between said opposed portions and said other means, one of said resilient means being compressed to oppose movement of said first named means toward the other opposed position and urge said included means toward movement limiting engagement with said housing while the other of said resilient means expands to simultaneously release a portion of its compressive force substantially equal to that stored by said one resilient means upon the compression thereof, the stored compressive force of said one resilient means being released upon movement of said first named means toward the one opposed position to assist such movement and said other resilient means being simultaneously compressed to restore the released portion of its compressive force in opposition to such movement of said first named means toward the one position until such movement disengages said included means from said housing.

References Cited

UNITED STATES PATENTS

| | | | |
|---|---|---|---|
| 2,892,468 | 6/1959 | Beuchle | 303—6 X |
| 3,143,125 | 8/1964 | Stelzer | 303—6 X |
| 3,245,221 | 4/1966 | James et al. | 303—6 X |
| 3,252,740 | 5/1966 | Stelzer | 303—6 |

MARTIN P. SCHWADRON, *Primary Examiner.*

ROBERT R. BUNEVICH, *Examiner.*

UNITED STATES PATENT OFFICE
CERTIFICATE OF CORRECTION

Patent No. 3,354,638                          November 28, 1967

Raymond J. Kersting

It is hereby certified that error appears in the above numbered patent requiring correction and that the said Letters Patent should read as corrected below.

Column 9, line 48, after "pressure" insert -- in --; column 10, lines 56 and 57, after "unloading" insert -- to --; line 59, for "respective" read -- respectively --; column 13, line 65, for "outlet ports, and" read -- and outlet ports, --.

Signed and sealed this 3rd day of December 1968.

(SEAL)

Attest:

Edward M. Fletcher, Jr.

Attesting Officer

EDWARD J. BRENNER

Commissioner of Patents